United States Patent [19]

Nakamura et al.

[11] Patent Number: 4,995,485
[45] Date of Patent: Feb. 26, 1991

[54] SEALING STRUCTURE OF AN ACCUMULATOR

[75] Inventors: Kouji Nakamura; Mamoru Akeda, both of Yokohama, Japan

[73] Assignee: NHK Spring Co., Ltd., Yokohama, Japan

[21] Appl. No.: 386,567

[22] Filed: Jul. 27, 1989

[30] Foreign Application Priority Data

Aug. 5, 1988 [JP] Japan .................. 63-103983[U]

[51] Int. Cl.$^5$ ................................. F16F 9/36
[52] U.S. Cl. .................. 188/322.17; 188/322.21; 277/58
[58] Field of Search .............. 188/322.16, 322.17, 188/322.18, 322.21; 277/58, 61, 62

[56] References Cited

U.S. PATENT DOCUMENTS

| | | | |
|---|---|---|---|
| 2,182,034 | 12/1939 | von Oberstadt | 188/322.17 |
| 2,182,034 | 12/1939 | von Oberstadt | 188/322.17 |
| 2,660,458 | 11/1953 | Collins et al. | 277/58 X |
| 2,660,458 | 11/1953 | Collins et al. | 277/58 X |
| 3,195,421 | 7/1965 | Rumsey et al. | 277/62 X |
| 3,195,421 | 7/1965 | Rumsey et al. | 277/62 X |
| 3,323,806 | 6/1967 | Smith et al. | 277/58 X |
| 3,323,806 | 6/1967 | Smith et al. | 277/58 X |
| 3,592,164 | 7/1971 | Schultze | |
| 3,621,952 | 11/1971 | Long, Jr. | |
| 3,942,806 | 3/1976 | Edlund | |
| 4,005,769 | 2/1977 | Itoh | |
| 4,166,523 | 9/1979 | Fujii et al. | |
| 4,386,686 | 6/1983 | Miura | 188/322.17 |
| 4,449,718 | 5/1984 | Muller | |
| 4,494,632 | 1/1985 | de Baan et al. | 188/269 |
| 4,720,085 | 1/1988 | Shinbori et al. | 267/64.16 |
| 4,735,402 | 4/1988 | Davis | |
| 4,746,106 | 5/1988 | Fukumura | 267/218 |
| 4,813,519 | 3/1989 | Matsubara et al. | 188/299 |
| 4,828,231 | 5/1989 | Fukumura et al. | 267/64.23 |
| 4,887,222 | 10/1989 | Davis | |

FOREIGN PATENT DOCUMENTS

| | | | |
|---|---|---|---|
| 0025874 | 4/1981 | European Pat. Off. | 188/322.17 |
| 2928296 | 1/1981 | Fed. Rep. of Germany | 188/322.17 |
| A073364 | 6/1960 | France | 188/322.17 |
| 2499190 | 1/1982 | France | |
| 2529984 | 1/1984 | France | |
| 1448864 | 9/1976 | United Kingdom | |
| 1520440 | 4/1968 | France | |
| 2238389 | 2/1975 | France | |
| 2229900 | 12/1974 | France | |
| 0141428 | 5/1986 | European Pat. Off. | |
| 3414821 | 11/1984 | Fed. Rep. of Germany | |
| 64-36765 | 3/1989 | Japan | |
| 0025874 | 4/1981 | European Pat. Off. | 188/322.17 |
| A073364 | 6/1960 | France | 188/322.17 |
| 2928296 | 1/1981 | Fed. Rep. of Germany | 188/322.17 |

Primary Examiner—Duane A. Reger
Attorney, Agent, or Firm—Frishauf, Holtz, Goodman & Woodward

[57] ABSTRACT

An accumulator comprises a housing and a rod. The housing is sealed by means of high- and low-pressure sealing devices. The high-pressure sealing device includes an annular groove formed on the inner surface of the housing, a seal ring with an L-shaped section housed in the annular groove, and an elastomeric O-ring disposed on the outer periphery side of the seal ring. The seal ring is composed of a thin wall portion, situated on the high-pressure side, and a thick wall portion situated on the low-pressure-side. The inner peripheral surface of the thick wall portion is in contact with the outer peripheral surface of the rod. A gap, which is wide enough to receive the hydraulic fluid, is defined between the inner peripheral surface of the thin wall portion and the outer peripheral surface of the rod. A drain recovery hole is connected between the high- and low-pressure sealing devices.

10 Claims, 5 Drawing Sheets

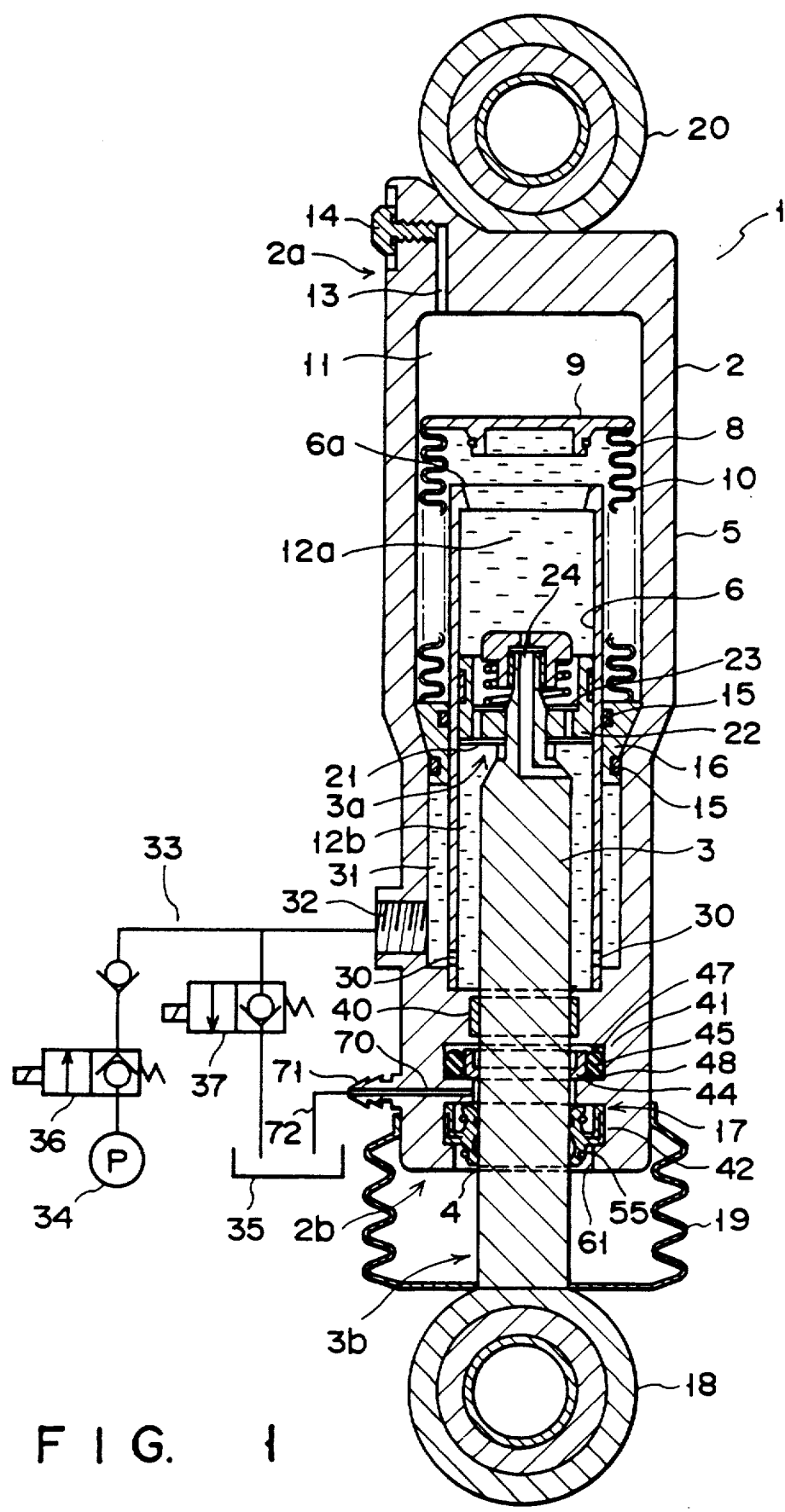
F I G. 1

SEALING STRUCTURE OF AN ACCUMULATOR

BACKGROUND OF THE INVENTION

1. Field of the Invention

The present invention relates to an accumulator having a housing and a rod, and more particularly, to a sealing structure at an insertion region of the accumulator through which the rod is inserted into the housing.

2. Description of the Related Art

A conventional shock absorber comprises a housing containing a hydraulic fluid therein, a rod inserted in the housing for axial movement, and a damping force generating mechanism disposed inside the housing. When the housing and the rod move relatively to each other in the axial direction, the fluid flows through the damping force generating mechanism, thereby damping the motion of the rod.

The shock absorber is used in combination with suspension springs of a motor vehicle. In this case, load of the vehicle body is supported by the suspension springs, so that the internal pressure of the housing need not be high. In a hydropneumatic suspension developed by the inventors hereof, however, the housing must be charged with a gas at a very high pressure in order that the vehicle body load is supported by means of the repulsive force of the gas in the housing. In this case, the gas pressure sometimes may attain 100 kgf/cm$^2$ or more. It is essential, therefore, to securely seal an insertion region at an open end of the housing for the insertion of the rod.

A typical example of the prior art sealing structure comprises an annular groove formed on the inner surface of a housing, in the vicinity of an open end thereof, a plastic seal ring housed in the groove, and an O-ring press-fitted between the outer peripheral surface of the seal ring and the bottom of the annular groove. The section of seal ring in its axial direction is rectangular, and the inner peripheral surface of the seal ring is in contact with the outer peripheral surface of the rod.

If the interference of the seal ring is too great, in the sealing structure described above, the frictional drag of the seal ring against the rod becomes too great, and lubrication of the seal ring is insufficient. In such a case, the rod cannot smoothly move, and the seal ring is liable to wear. If the interference of the seal ring is too small, on the other hand, an excessive, unstable fluid leakage is caused between the rod and the seal ring, especially when the rod moves at high speed.

SUMMARY OF THE INVENTION

Accordingly, the object of the present invention is to provide a sealing structure in which a rod can be smoothly moved with a small frictional drag despite a high internal pressure of a housing, and an excessive fluid leakage can be restrained during the rod motion. The present invention may be applied to various accumulators, including a hydropneumatic suspension.

In a sealing structure according to the present invention, a seal ring is subjected to an ideal pressure distribution for sealing an insertion region between a housing and a rod. Advantages of the invention are as follows. Since the contact width of the seal ring on the rod is short, so that the frictional drag is small. Lubrication between the rod and the seal ring is good. Even though the rod moves at high speed, moreover, the fluid leakage between the rod and the seal ring is very small and stable. Further, the construction is simple and compact, requiring only a small number of components.

The sealing structure according to the present invention comprises a seal ring disposed in the vicinity of the open end of the housing and having an L-shaped section at each circumferential part thereof, said seal ring including a thin wall portion situated on the high-pressure side and a thick wall portion situated on the low-pressure side, the inner peripheral surface of said thick wall portion being in contact with the outer peripheral surface of the rod so that a gap for the hydraulic fluid is defined between the inner peripheral surface of the thin wall portion and the outer peripheral surface of the rod; seal retaining means attached to the housing and including an annular groove containing the seal ring; and an elastomeric O-ring interposed between the outer peripheral surface of the seal ring and the bottom of the annular groove so as to be in intimate contact with the outer peripheral surface of the seal ring and the bottom of the annular groove, throughout the circumference thereof.

BRIEF DESCRIPTION OF THE DRAWINGS

FIG. 1 is a longitudinal sectional view of a suspension according to an embodiment of the present invention;

DETAILED DESCRIPTION OF THE PREFERRED EMBODIMENTS

Figure 2:
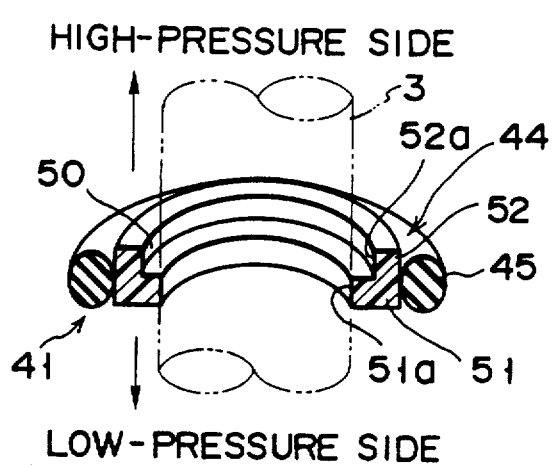
FIG. 2 is a perspective view, partially in section, showing part of a high-pressure sealing device shown in FIG. 1.

Hydropneumatic suspension system 1 for motor vehicle shown in FIG. 1 comprises housing 2, having closed end 2a and open end 2b, and rod 3 adapted to be axially inserted into housing 2 through open end 2b. One end 3a of rod 3 is situated inside housing 2, while the other end 3b of rod 3 is situated outside. Open end 2b is provided with hole 4 through which rod 3 is passed.

Housing 2 is composed of outer cylinder 5 and inner cylinder 6 coaxial with each other. The internal space of housing 2 is divided into gas chamber 11, and liquid chambers 12a and 12b, by partition member 10, which is composed of metallic bellows 8 and bellows cap 9. Liquid chambers 12a and 12b are filled with oil, for use as a hydraulic fluid. Gas chamber 11 is charged with an inert gas, such as nitrogen, through gas supply port 13. Port 13 is closed by means of plug 14 after the gas charge. The pressure of the gas with which chamber 11 is charged ranges from, e.g., about 30 to 150 kgf/cm$^2$ in the state of FIG. 1 in which partition member 10 is in a neutral position. The gas pressure acts on liquid chambers 12a and 12b, and also urges rod 3 to be forced out of housing 2. Bellows cap 9 can releasably engage open end 6a of inner cylinder 6. A fixed end of bellows 8 is fixed to housing 2 by means of bellows fixing member 16 which has O-ring 15.

Sealing structure 17 (mentioned later) is provided in the vicinity of open end 2b of housing 2. Component 18, which is to be connected to an axle member (not shown), and dust cover 19 are attached to outer end 3b of rod 3. Component 20 for connection attached to closed end 2a of housing 2 is connected to part of a motor vehicle body (not shown). The relative vertical positions of housing 2 and rod 3 may alternatively be inverted.

Damping force generating mechanism 21 is attached to one end 3a of rod 3 which is located inside housing 2. Mechanism 21 includes piston 22, plate valve assembly 23, and constant orifice 24. Piston 22 divides first and second liquid chambers 12a and 12b.

Liquid chamber 31 communicates with second liquid chamber 12b through holes 30 of inner cylinder 6. Oil port 32 opens into chamber 31. Hydraulic power unit 33 is connected to port 32. Unit 33 includes pump 34, tank 35 containing the hydraulic fluid, and solenoid-controlled valves 36 and 37.

Ring-shaped bearing metal 40, for use as bearing means, is provided on the inner surface of rod hole 4. Sealing structure 17 includes bearing metal 40, high-pressure sealing device 41 situated on the high-pressure side or on the side of liquid chamber 12b, and low-pressure sealing device 42 situated on the low-pressure side or on the side of open end 2b.

Figure 3:
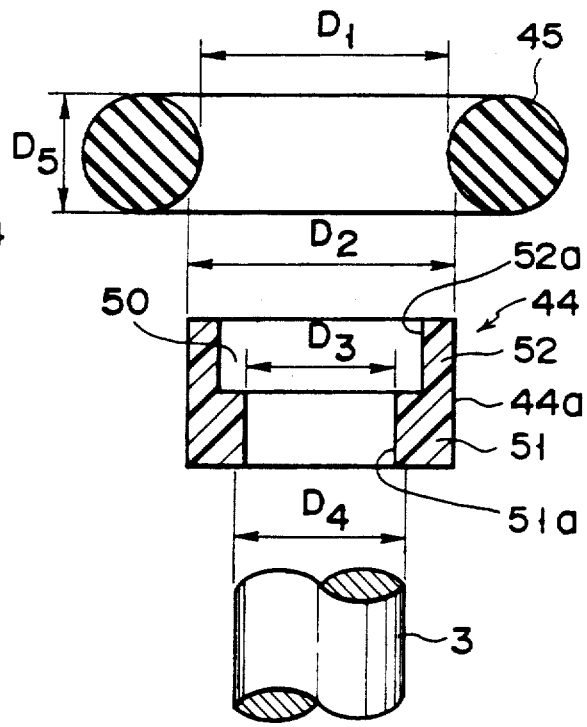
FIG. 3 is a sectional view showing dimensional relationships between a seal ring and an O-ring.

High-pressure sealing device 41 is composed of plastic seal ring 44 and O-ring 45 in intimate contact with the outer peripheral surface of ring 44. As shown in FIG. 3, inside diameter $D_1$ of O-ring 45 in a free state is smaller than the outside diameter $D_2$ of seal ring 44, and inside diameter $D_3$ of ring 44 in a free state is a little smaller than outside diameter $D_4$ of rod 3. If $D_1$, $D_2$, $D_3$, and $D_4$ are, for example, 29.7 mm, 29.8 mm, 24.8 mm, and 25.0 mm, respectively, the differences between $D_1$ and $D_2$ and between $D_3$ and $D_4$ are 0.1 mm and 0.2 mm, respectively.

Seal ring 44 and O-ring 45 are housed in annular groove 47 in the inner peripheral surface of rod hole 4. The sectional shape of each circumferential part of elastomeric ring 45, as viewed in the axial direction, is circular. O-ring 45 is press-fitted into the space between outer peripheral surface 44a of seal ring 44 and bottom 48 of groove 47. Polytetrafluoroethylene mixed with graphite is an example of low-friction resin which is recommendable as the material of ring 44. However, seal ring 44 may be formed of a metallic or plastic ring body coated with the low-friction resin at least on the inner peripheral surface thereof.

Figure 4:
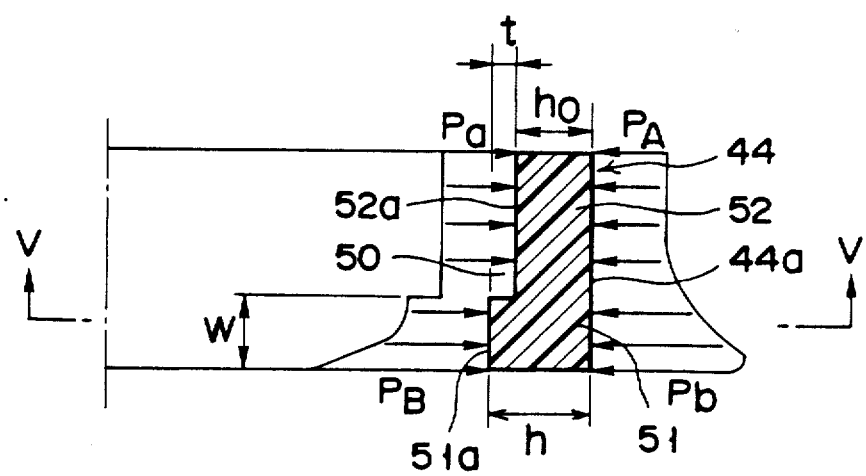
FIG. 4 shows a relationship between the cross section of the seal ring of FIG. 1 and a pressure acting on the ring.

As shown in FIGS. 2 to 4, the section of each circumferential part of seal ring 44, as viewed in the axial direction, is L-shaped. Ring 44 is composed of thick wall portion 51, situated on the low-pressure side or on the side of low-pressure sealing device 42, and thin wall portion 52 situated on the high-pressure side or on the side of bearing metal 40. Inner peripheral surface 51a of portion 51 is in contact with the outer peripheral surface of rod 3. Inner peripheral surface 52a of portion 52 is not in contact with the peripheral surface of rod 3. Thus, gap 50 for the hydraulic fluid is defined between the outer peripheral surface of rod 3 and inner peripheral surface 52a of thin wall portion 52.

Figure 6:
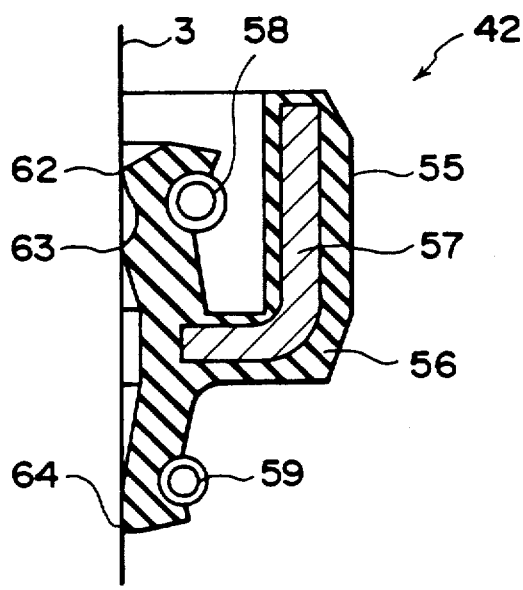
FIG. 6 is a sectional view of a low-pressure sealing device shown in FIG. 1

As shown in FIG. 6, for example, oil seal 55 is used as low-pressure sealing device 42. Seal 55 is composed of body 56 formed of elastomer, metal ring 57 with an L-shaped cross section embedded in body 56, and garter springs 58 and 59. The oil seal is housed in annular groove 61 formed in the inner surface of rod hole 4. A pair of seal lips 62 and 63 and dust lip 64 on the inner peripheral surface of body 56 extend individually in the circumferential direction of body 56. Lips 62, 63 and 64 ar in intimate contact with the outer peripheral surface of rod 3.

Drain recovery hole 70 opens between high- and low-pressure sealing devices 41 and 42. It also opens into tank 35 of hydraulic power unit 33 through end connection 71 and drain pipe 72. The hydraulic fluid in tank 35 can be delivered to oil port 32 by means of pump 34.

The following is a description of the operation of the system according to the embodiment with the aforementioned construction.

Since gas chamber 11 is charged with the high-pressure gas, load of the motor vehicle body can be supported by means of only the repulsive force of the gas in chamber 11, without separately using suspension springs.

When rod 3 moves in a direction (contracting direction) such that it is pushed from its neutral position into housing 2, some of the hydraulic fluid in first liquid chamber 12a flows through damping force generating mechanism 21 into second liquid chamber 12b. When the hydraulic fluid flows through mechanism 21, the motion of rod 3 is damped by the fluid friction of the fluid. When rod 3 moves in the push-in direction, moreover, gas chamber 11 is further compressed as the depth of insertion of rod 3 in housing 2 increases, so that the repulsive force of the gas increases.

When rod 3 moves in a direction (extending direction) such that it gets out of housing 2, on the other hand, some of the hydraulic fluid in second liquid chamber 12b flows through damping force generating mechanism 21 into first liquid chamber 12a. As the depth of insertion of rod 3 in housing 2 decreases, the capacity of gas chamber 11 increases.

When the hydraulic fluid is supplied to liquid chambers 12a and 12b as pump 34 is driven and valve 36 is opened, the height of the motor vehicle is increased. When some of the fluid in chambers 12a and 12b is discharged as valve 36 is closed and valve 37 is opened, the vehicle height is reduced.

The gas pressure inside gas chamber 11 always acts on liquid chambers 12a and 12b. When rod 3 moves in the extending direction, moreover, the pressure inside chamber 12b further increases. Since high pressure acts on liquid chamber 12b in this manner, some of the hydraulic fluid in chamber 12b leaks little by little through bearing metal 40 to the side of high-pressure sealing device 41. The pressure of the leaked fluid lowers as the fluid passes through metal 40. In sealing device 41, the fluid pressure acts on the whole inner and outer peripheral surfaces of seal ring 44, as indicated by arrows in FIGS. 4 and 5. As rod 3 axially moves relatively to ring 44, the hydraulic fluid forms a lubricating oil film between inner peripheral surface 51a of ring 44 and rod 3. The fluid, thus forming the lubricating oil film, stably leaks little by little to the side of low-pressure sealing device 42. The leaked fluid between high- and low-pressure sealing devices 41 and 42 is withdrawn into tank 35 via drain recovery hole 70. The recovered fluid is returned to liquid chamber 12b at a suitable point of time by means of hydraulic power unit 33. As the leaked fluid passes between bearing metal 40 and high-pressure sealing device 41, its pressure is considerably lowered. Therefore, the leaked fluid reaching low-pressure sealing device 42 does not leak from oil seal 55 even though the interference of oil seal 55 is small.

In sealing structure 17 with the aforementioned arrangement, the whole inner peripheral surface of thick wall portion 51 or the low-pressure portion of seal ring 44 is brought into intimate contact with the outer peripheral surface of rod 3, so that the space between ring 44 and rod 3 is sealed. The space between outer peripheral surface 44a of ring 44 and housing 2 is sealed by means of O-ring 45. Since notch 50 is formed on the inner periphery side of seal ring 44, the width of contact between ring 44 and rod 3 is small. Moreover, the pressure acting on inner peripheral surface 52a of notch 50 balances with some of the pressure acting on outer peripheral surface 44a of ring 44, so that the force to clamp rod 3 cannot be too great. Since notch 50 has a minimum necessary size, there is no need of a reinforcing ring. Since notch 50 is not tapered, furthermore, high-speed movement of rod 3 never entails an increased fluid leakage at sliding portions.

Figure 5:
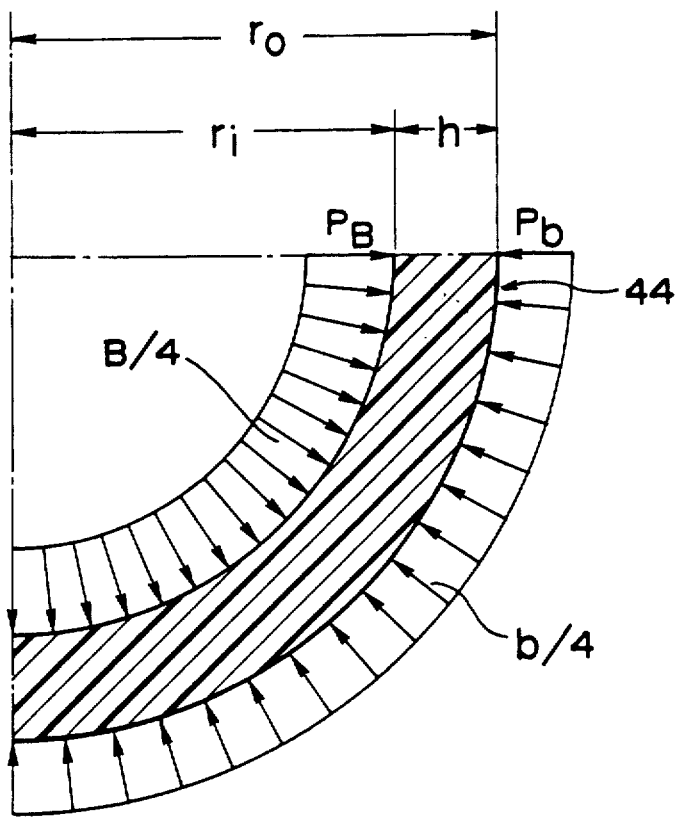
FIG. 5 shows a relationship between a cross section along line V—V of FIG. 4 and the pressure.

The symbols used in FIGS. 4 and 5 are defined as follows.

F: Frictional drag.
$\mu$: Coefficient of friction.
A: Fluid pressure on the inner periphery of seal ring 44.
B: Force of contact between rod 3 and ring 44.
a: Sum of fluid pressure on the inner periphery of ring 44 and contact force of O-ring 45.
b: Sum of fluid pressure on the outer periphery of ring 44 and Contact force of O-ring 45.
$P_A$: Fluid pressure.
$P_B$: Mean pressure of contact between rod 3 and ring 44.
$P_a$: Mean pressure of a.
$P_b$: Mean pressure of b.
$r_i$: Inside radius of ring 44.
$r_o$: Outside radius of ring 44.
h: Wall thickness of ring 44.
w: Width of contact between rod 3 and ring 44.

Dynamical friction drag F is given as follows.

Figure 7:
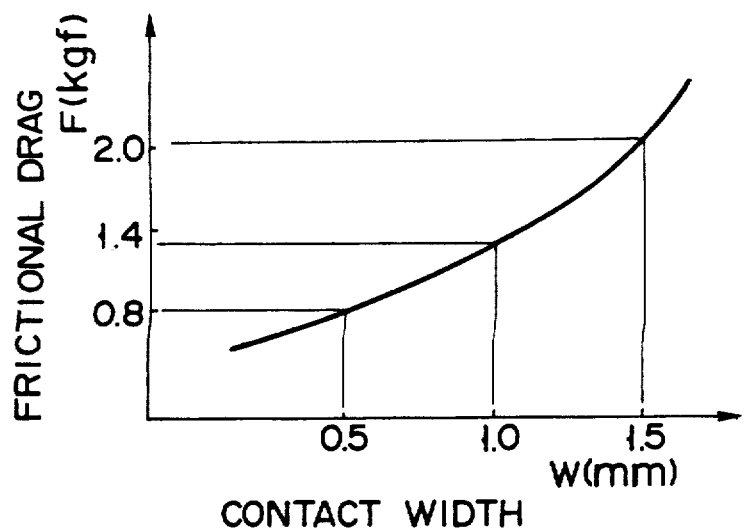
FIG. 7 is a diagram showing a relationship between the contact width of the seal ring and frictional drag.
Figure 8:
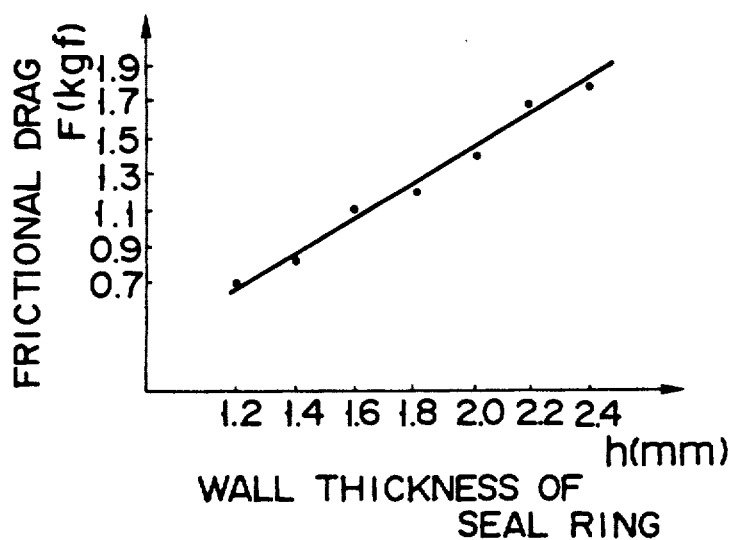
FIG. 8 is a diagram showing a relationship between the wall thickness of the seal ring and frictional drag.

$F = \mu \cdot B,$ $B = b,$ $B = 2\pi r_i \cdot w \cdot p_B,$ $b = 2\pi r_o \cdot w \cdot P_b,$ $F = \mu \cdot 2\pi (r_i + h) \cdot w \cdot P_b.$ As seen from these equations, the greater contact width w and wall thickness h, the greater friction drag F is. If width w is smaller, the contact portions between rod 3 and seal ring 44 can be more easily lubricated, so that coefficient of friction $\mu$ is lowered. FIG. 7 shows the relationship between contact width w and frictional drag F when the oil pressure of the high-pressure side is different by 90 kgf/cm$^2$ from that of the lower-pressure side. FIG. 8 shows the relationship between wall thickness h and frictional drag F.

If contact width w is less than 1 mm, the state of contact between rod 3 and seal ring 44 is so unstable that an excessive fluid leakage may possibly be caused. If w exceeds half of thickness $D_5$ of O-ring 45, frictional drag F becomes too great. Preferably, therefore, contact width w should be not less than 1 mm and not more than half the thickness of ring 45. If wall thickness h of seal ring 44 is too small, the rigidity of ring 44 is insufficient. Preferably, therefore, h is 1.5 mm or more, thickness $h_o$ of thin wall portion 52 is 1 mm or more, and difference t between h and $h_o$ is 0.5 mm or more.

The aforementioned sealing structure has the following advantages.

(1) Even though the pressure inside liquid chamber 12b is high, the frictional drag between rod 3 and seal ring 44 is small. The space between rod 3 and seal ring 44 can be fully lubricated. Thus, the motion of rod 3 relative to housing 2 is smooth, and ring 44 cannot easily wear, and therefore, is highly durable.

(2) When rod 3 rotates at high speed, the fluid leakage caused in high-pressure sealing device 41 is small and stable. The leaked hydraulic fluid between sealing devices 41 and 42 can be withdrawn into tank 35 via drain recovery hole 70.

(3) As the leaked fluid passes between bearing metal 40 and high-pressure sealing device 41, its pressure is considerably lowered. Therefore the leaked fluid reaching low-pressure sealing device 42 does not leak from oil seal 55 even though the interference of oil seal 55 is small.

(4) The construction of high-pressure sealing device 41 is simple and compact. More specifically, it requires use of only two components, that is, seal ring 44 and O-ring 45, which have simple shapes.

Figure 9:
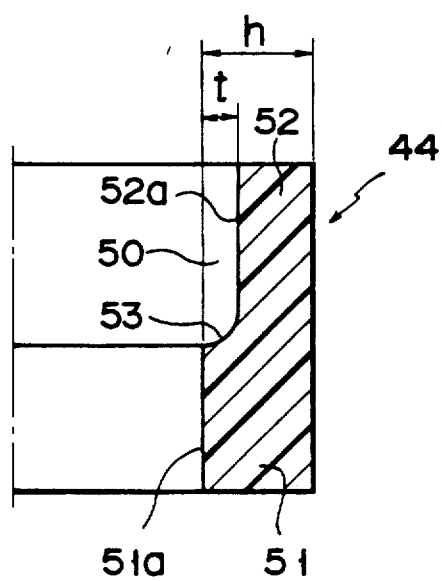
FIGS. 9 and 10 are sectional views individually showing modifications of the seal ring.
Figure 10:
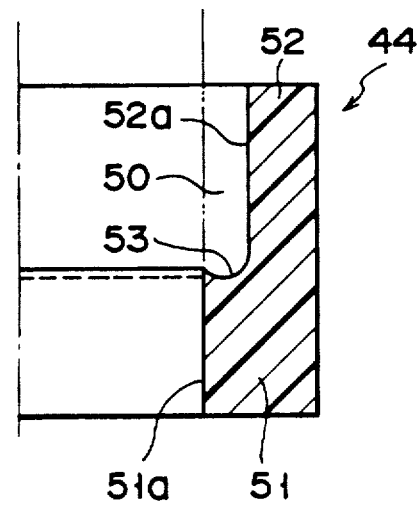

The shape of seal ring 44 is not limited to the one described in connection with the above embodiment. As shown in FIG. 9, for example, connective portion 53 between thick and thin wall portions 51 and 52 of ring 44 may be made arcuate. Alternatively, connective portion 53 may be made to have an arcuately depressed profile, as shown in FIG. 10.

What is claimed is:

1. A sealing structure of an accumulator which comprises a housing, having a closed end and an open end and containing a hydraulic fluid therein, and a rod adapted to be inserted into the housing through the open and thereof, the rod having an outer peripheral surface, said sealing structure being located at that portion of the accumulator where the rod is inserted into the housing, said sealing structure comprising:
a high-pressure sealing device situated at a position near to the open end of the housing;
a low-pressure sealing device disposed between the high-pressure sealing device and the open end of the housing;

said high-pressure sealing device including:
(A) a seal ring disposed in the vicinity of the open end of the housing and having a substantially L-shaped section at each circumferential part thereof, the seal ring including a thin wall portion situated on the high-pressure side and a thick wall portion situated on the low-pressure side, the thin and thick wall portions having respective inner peripheral surfaces, the inner peripheral surface of the thick wall portion being in contact with the outer peripheral surface of the rod so that a gap for the hydraulic fluid is defined between the inner peripheral surface of the thin wall portion and the outer peripheral surface of the rod;

(B) seal retaining means attached to the housing and including an annular groove containing the seal ring, the annular groove having a bottom; and (C) an O-ring interposed between an outer peripheral surface of the seal ring and the bottom of the annular groove so as to be in intimate contact with the outer peripheral surface of the seal ring and the bottom of the annular groove, throughout the circumference thereof;

drain means connected between the high- and low-pressure sealing devices; and a hydraulic power unit means, coupled to the drain means, for replenishing the liquid chamber of the housing with hydraulic fluid recovered by means of the drain means.

2. The sealing structure according to claim 1, wherein said seal ring is formed of a synthetic resin, and there are relations $D_1 < D_2$ and $D_3 < D_4$, where $D_1$, $D_2$, $D_3$, and $D_4$ are the inside diameter of the O-ring, the outside diameter of the seal ring, the inside diameter of the seal ring, and the outside diameter of the rod, respectively.

3. The sealing structure according to claim 1, wherein said seal ring is formed of a low-friction synthetic resin mixed with graphite.

4. An accumulator comprising:

a housing having a closed end and an open end, and defining therein a liquid chamber containing a hydraulic fluid;

a rod adapted to be inserted into the housing through the open end thereof, said rod having an outer peripheral surface;

bearing means disposed in the vicinity of the open end of the housing, said bearing means having an inner peripheral surface which is in contact with the outer peripheral surface of the rod;

a high-pressure sealing device situated at a position nearer to the open end of the housing than the bearing means is;

a low-pressure sealing device disposed between the high-pressure sealing device and the open end of the housing;

said high-pressure sealing device including:

(a) a seal ring having a substantially L-shaped section at each circumferential part thereof, the seal ring including a thin wall portion situated on the high-pressure side and a thick wall portion situated on the low-pressure side, the thin and thick wall portions having respective inner peripheral surfaces, the inner peripheral surface of the thick wall portion being in contact with the outer peripheral surface of the rod so that a gap for the hydraulic fluid is defined between the inner peripheral surface of the thin wall portion and the outer peripheral surface of the rod;

(b) seal retaining means attached to the housing and including an annular groove containing the seal ring, the annular groove having a bottom; and (c) an O-ring interposed between an outer peripheral surface of the seal ring and the bottom of the annular groove so as to be in intimate contact with the outer peripheral surface of the seal ring and the bottom of the annular groove, throughout the circumference thereof;

drain means connected between the high- and low-pressure sealing devices; and a hydraulic power unit means, coupled to the drain means, for replenishing the liquid chamber of the housing with hydraulic fluid recovered by means of the drain means.

5. The accumulator according to claim 4, wherein said low-pressure sealing device comprises an oil seal including:

an elastomeric body, having an outer peripheral portion and having lips in contact with the outer peripheral surface of the rod, and a ring-shaped garter spring fitted on the outer peripheral portion of the body, thereby clamping the body.

6. The accumulator according to claim 4, wherein said O-ring is an elastomeric O-ring.

7. The sealing structure according to claim 4, wherein said seal ring is formed of a synthetic resin, and there are relations $D_1 < D_2$ and $D_3 < D_4$, where $D_1$, $D_2$, $D_3$, and $D_4$, are the inside diameter of the O-ring, the outside diameter of the seal ring, the inside diameter of the seal ring, and the outside diameter of the rod, respectively.

8. The sealing structure according to claim 1, wherein said seal ring is formed of a low-friction synthetic resin mixed with graphite.

9. The accumulator according to claim 1, wherein said O-ring is an elastomeric O-ring.

10. The accumulator according to claim 1, wherein said low-pressure sealing device comprises an oil seal including:

an elastomeric body, having an outer peripheral portion and having lips in contact with the outer peripheral surface of the rod, and a ring-shaped garter spring fitted on the outer peripheral portion of the body, thereby clamping the body.

* * * * *